Patented Jan. 31, 1928.

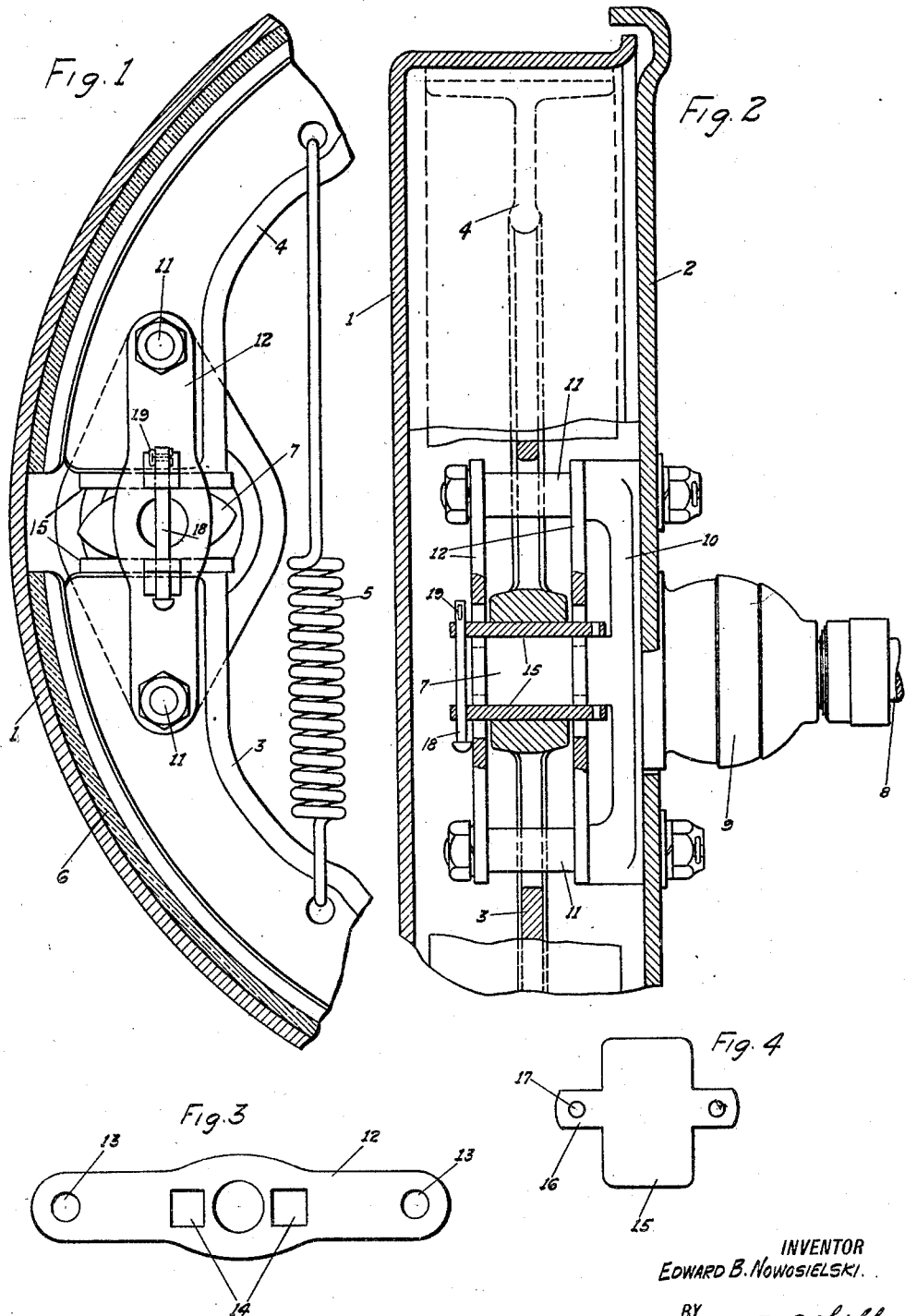

1,657,867

UNITED STATES PATENT OFFICE.

EDWARD B. NOWOSIELSKI, OF BLOOMFIELD, NEW JERSEY, ASSIGNOR TO BENDIX BRAKE COMPANY, OF SOUTH BEND, INDIANA.

BRAKE MECHANISM.

Application filed September 28, 1925. Serial No. 59,010.

This invention relates to improvements in brake mechanisms such as are especially adapted for use in connection with automotive vehicles.

The brake mechanism herein disclosed consists of one or more brake shoes preferably of the internal expanding type which may be actuated either by a mechanical device or by a fluid actuated part.

My invention is applicable to brakes of various designs, either cast or pressed and of the ordinary two shoe expansion type, or of the self energizing type in which a secondary shoe is permanently anchored at the end near the brake actuating means. In the various designs of brake shoes whether of the cast, rolled or pressed type, it is customary practise to attach to the end of the shoe, a piece of metal capable of being hardened, which piece is adapted to receive a cam or equivalent actuating means.

It is one of the objects of my invention to provide an arrangement of the brake shoe ends such that the construction will be simplified and the part or parts engaged by the cam or its equivalent may be quickly removed or reversed as desired.

Another object of my invention is to provide a cam engaging member which is made and mounted entirely separate from the brake shoe so that it may be removed or reversed in its position without disturbing the said shoe.

Other objects will be apparent to one skilled in this art after a study of the specification taken in connection with the annexed drawing in which Figure 1 is a fragmentary end view of a wheel showing a pair of internal expanding brakes, the view being turned at 90° from the ordinary position of the cam and shoes.

Figure 2 is a part vertical sectional view of the wheel.

Figure 3 is a plan view of one of the support members, while

Figure 4 is a plan view of one of the cam engaging members.

In the drawing wherein like numbers refer to corresponding parts in the various views, 1 illustrates the drum of the wheel, the inner part of which is closed by a plate 2 supported on a stationary member. Within the drum 1 is positioned the necessary brake shoes, two being illustrated and numbered 3 and 4. These brake shoes may be of any desired construction either cast, rolled or pressed and supported within the drum 1 in any satisfactory manner. The shoes 3 and 4 are adapted to be normally held in released position by a spring 5. The brake shoes are equipped with the usual friction material 6 for engaging the surface of the drum 1. The brake shoe or shoes may be actuated or brought into engagement with the drum by any satisfactory means such as a cam 7 which device is adapted to be actuated by a shaft 8 operating through a universal joint 9, the support members for the joint and cam 7 being carried by the member 10 which is fastened to the plate 2 by bolts or studs 11.

A pair of support members 12 is carried on the studs 11 which pass through the holes 13 in the member 12, which are provided with rectangular shaped holes 14 on both sides of the center. The members 12 carry a pair of plates 15 which are preferably made of metal that can be hardened in order to withstand the action of the cam 7 or its equivalent means. The cam engaging plates 15 are provided with lugs 16 that are adapted to fit within the holes 14 in the members 12 so that the plates 15 may slide laterally under the action of the cam 7, or under the action of the brake shoes when they are returned to normal position by the spring 5 after releasing of the cam 7. As will be seen from the drawing the cam engaging plates 15 are constructed so they are reversible in position. The lugs 16 are provided with holes 17 to receive guide pins 18, which may be used, in order to more properly keep the plates 15 in alignment. The pin 18 may be provided with a cotter pin 19 at one end to keep it in position.

From the construction described it will be seen that when the wheel carrying the brake drum 1 is drawn from the vehicle, the cam engaging plates with their support members may be quickly detached for renewal purposes, or reversal of the plates 15, if it be found advisable to reverse them due to the wear of the cam or its equivalent. It will also be noted that the members 12 are made interchangeable so that only one set of tools is required to make the two parts. By making the cam engaging plates 15 entirely separate and independent from the brake shoes, the entire construction is much simplified and cheapened.

While I have shown one form of carrying out my invention, I do not wish to be limited to the precise details since the drawings are merely illustrative of my invention.

Having thus described my invention what I claim is:

1. In combination with a brake shoe, a cam for actuating the shoe, a plate slidably mounted independently of the shoe between the end thereof and the cam.

2. In a brake mechanism, a plurality of brake shoes, a cam, a pair of support members arranged alongside of the cam adjacent its non-working faces, and a cam contact plate movably carried by said support members on each side of the cam adjacent the ends of a pair of said brake shoes.

3. In a brake mechanism, a plurality of brake shoes, a cam, a pair of support members disposed on opposite sides of the shoe ends and extending beyond the cam adjacent its non-working faces, and a hardened cam contact plate carried by said support members on each side of the cam adjacent the ends of a pair of said brake shoes, said contact plates being mounted on said support members so as to be moved laterally against the ends of said shoes by said cam.

4. In a brake mechanism, a plurality of brake shoes, a cam, supporting and actuating means for the cam, a pair of hardened cam contact members disposed on opposite sides of the cam adjacent the brake shoe ends and means carried by a part of the cam supporting means adjacent the sides of the non-working faces of the cam for movably carrying said cam contact members.

5. In a brake mechanism, at least one movable brake shoe, a cam for actuating the same, a hardened and reversible contact member slidably mounted adjacent the end of the brake shoe and adapted to be engaged by the cam when actuated to move said shoe.

6. In a brake mechanism, a plurality of brake shoes, a cam, supporting and actuating means for the cam, a pair of hardened and reversible cam contact members disposed on opposite sides of the cam adjacent the brake shoe ends and means carried by a part of the cam supporting means for slidably carrying said cam contact members.

7. In a brake mechanism for vehicle wheels, a metal brake member, a cam and an auxiliary metal piece independently interposed between the cam and brake member and means arranged adjacent the non-working faces of the cam for supporting said auxiliary metal pieces for lateral movement thereof as the cam is operated.

8. In a brake mechanism for vehicle wheels, a metal brake member, a cam and a hardened substantially flat and reversible cam follower separately mounted for lateral movement between the cam and the brake member.

9. In combination with a revoluble drum, a stationary plate for closing the opening in the drum, and a brake shoe carried by said plate, a separable support carried by said plate and means for actuating the brake shoe carried by said support and a movable member interposed between the shoe and said actuating means and carried by said separable support.

In testimony whereof, I affix my signature.

EDWARD B. NOWOSIELSKI.